A. J. BALL.
AUTOMATIC WEIGHING MACHINE.
APPLICATION FILED JULY 12, 1909.
947,986.
Patented Feb. 1, 1910.
4 SHEETS—SHEET 2.
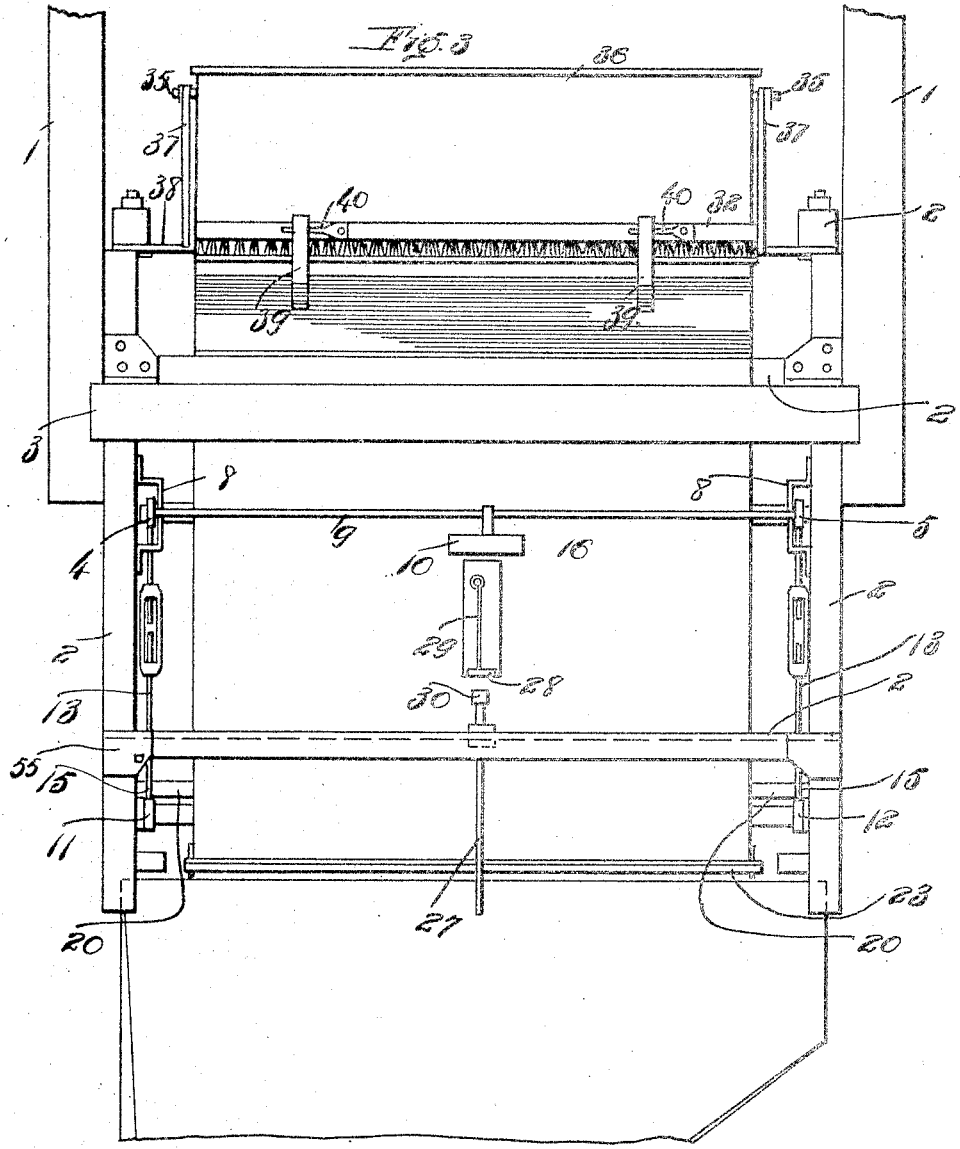
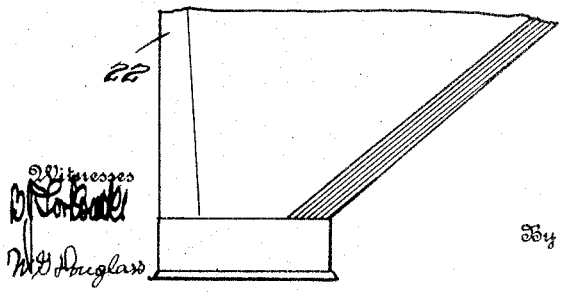
Inventor,
A. J. Ball,
By A. D. Jackson,
Attorney

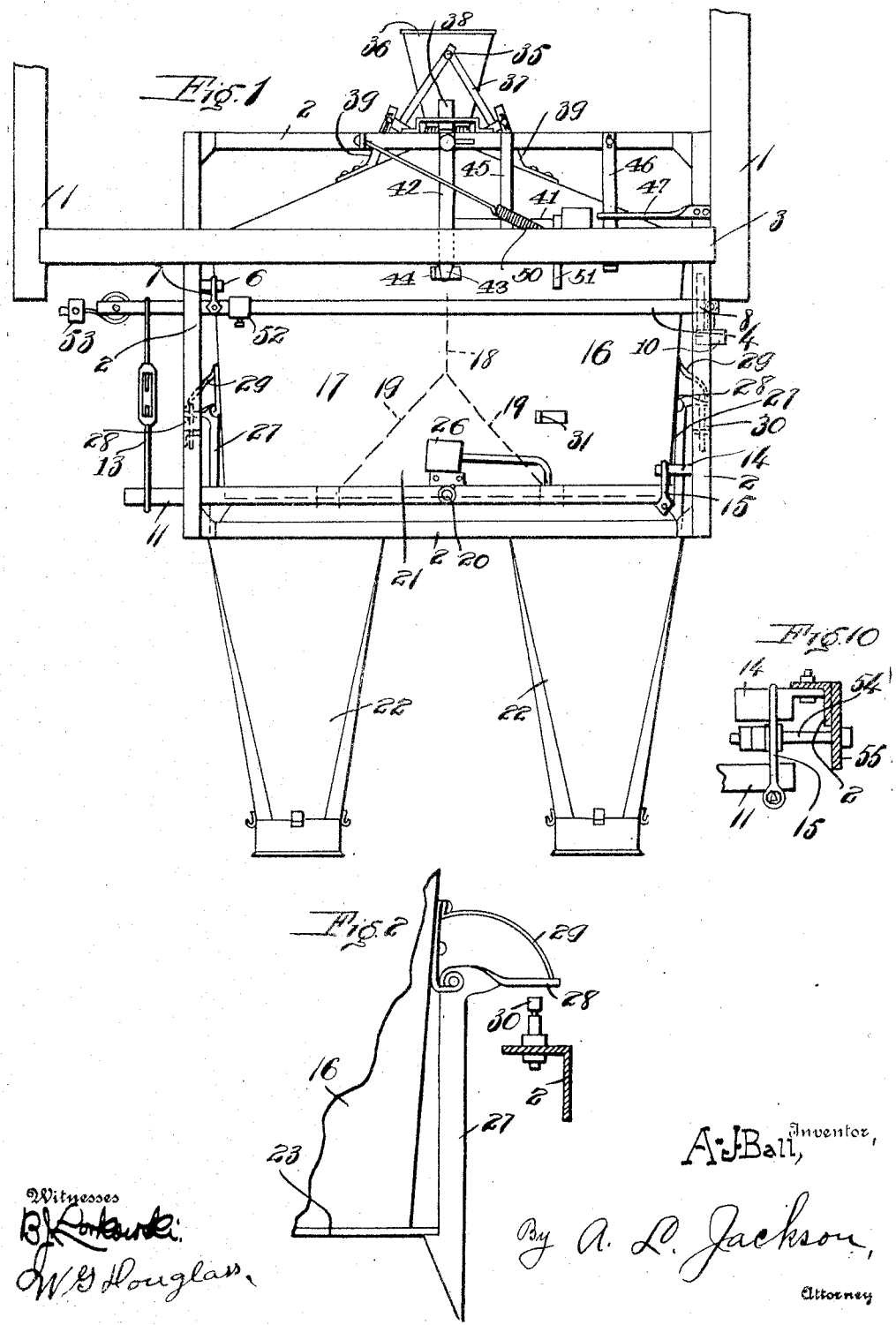

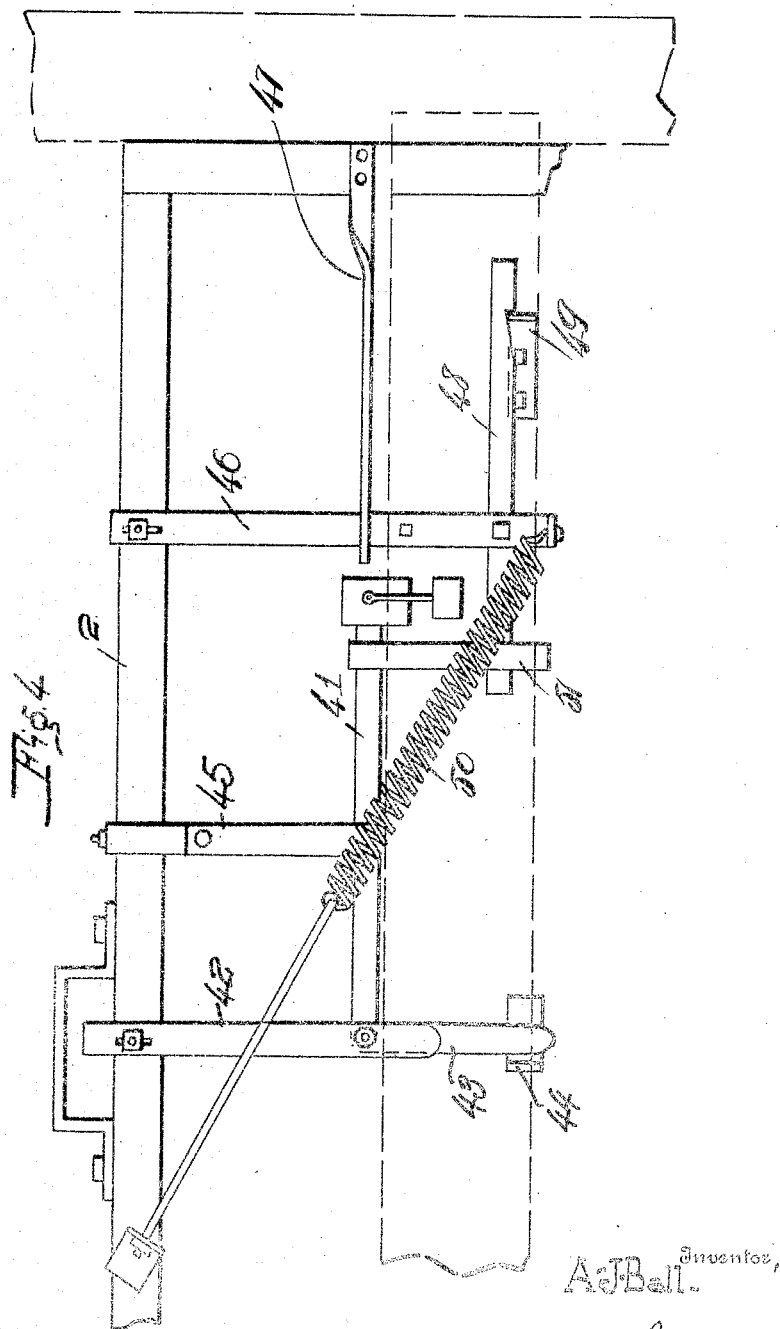

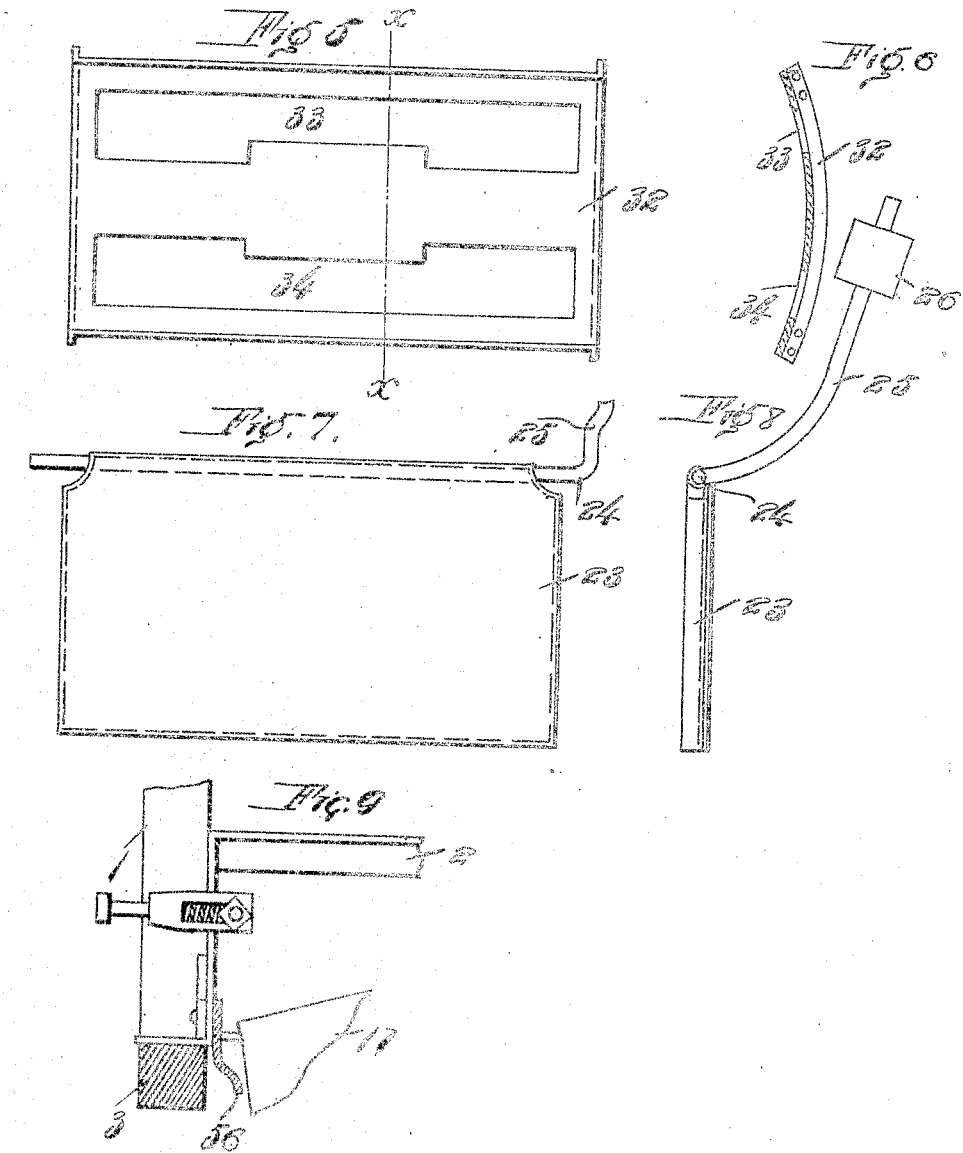

UNITED STATES PATENT OFFICE.

ANDREW J. BALL, OF FORT WORTH, TEXAS.

AUTOMATIC WEIGHING-MACHINE.

947,986.  Specification of Letters Patent.  Patented Feb. 1, 1910.

Application filed July 12, 1909. Serial No. 507,076.

*To all whom it may concern:*

Be it known that I, ANDREW J. BALL, a citizen of the United States, residing at Fort Worth, in the county of Tarrant and State of Texas, have invented certain new and useful Improvements in Automatic Weighing-Machines, of which the following is a specification.

My invention relates to a machine for weighing grain and other small articles, and the object is to provide a machine which will weigh accurately and uniformly and automatically discharge a load as soon as a predetermined amount is obtained from a falling stream of grain or other goods.

One object is to provide two discharging hoppers so that there will be no intermission during operations and this is accomplished by using the hoppers alternately. As soon as one hopper is filled or the required amount is received in the hopper, the hopper is displaced and the other hopper is immediately brought into position to receive a charge.

Other objects and advantages will be fully explained in the following description and the invention will be more particularly pointed out in the claims.

Reference is had to the accompanying drawings which form a part of this application.

Figure 1 is a side elevation of the machine. Fig. 2 is a detail view, illustrating the trap door tripping mechanism. Fig. 3 is an end elevation of the machine. Fig. 4 is a side elevation of a portion of the machine, illustrating the tripping mechanism. Fig. 5 is a plan view of the double valve. Fig. 6 is a cross-section of the valve shown in Fig. 5 taken along $x$—$x$ of Fig. 5. Fig. 7 is a plan view of one of the trap doors. Fig. 8 is an edge view of the same. Fig. 9 is a detail view, showing a buffer for the discharge hopper on one side. Fig. 10 is a detail view, showing the manner of hanging the ends of the pivot beams.

Similar characters of reference are used to indicate the same parts throughout the several views.

The machine is shown mounted in rigid hangers 1 and provided with a frame, preferably constructed of angle bars 2. The hangers 1 are connected by cross beams 3 and the angle bars 2 are attached to the hangers 1 and cross beams 3. Scale beams 4 and 5 are swingingly mounted on brackets 6 by clevises 7 in which the beams are pivotally mounted. The free ends of the beams 4 and 5 are limited in their movements by the brackets 8 and the free ends are connected by a rod 9 which may be provided with a weight 10. The supporting beams 11 and 12 are suspended at one end on the scale beams by rods 13 which are provided with turnbuckles and at the other ends, these beams 11 and 12 are suspended on brackets 14 (which are attached to the angle bars 2) by means of clevises 15, the beams being pivotally mounted in the clevises. The scale beams and the supporting beams carry the entire weight of a double hopper composed of hopper 16 and hopper 17. These hoppers are divided by a partition along the line 18. The lines 19 indicate the inclined parts of the walls of the hoppers which extend from the partition 18 downwardly. The hoppers 16 and 17 have their sides of a common piece of sheet metal 21 and this metal engages the rocker shaft 20. Both hoppers are thus supported on the shaft 20 which is pivotally mounted in the beams 11 and 12. The hoppers 16 and 17 are so arranged on the shaft 20 that each beam will be tilted at the moment the desired weight of goods has been received. When the hopper is tilted it strikes a trip hereinafter explained and the trap door is opened and the load is discharged. Each hopper is provided with a chute 22 for directing the goods to a suitable receptacle. Each hopper is provided with a trap door 23 which is pivotally connected to one edge of the hopper by a shaft 24.

An arm 25 is rigid with the shaft 24 and carries a weight 26. The doors 23 are held closed normally by dogs 27 which are pivotally connected to the sides of the hoppers. The dogs 27 have arms 28 and springs 29 press on these arms to hold the dogs normally in engagement with the trap doors 23. When the hoppers are tilted the arms 28 strike the trip 30 which will disengage the dogs 27 and then let the doors fall and discharge the contents of the hopper. The weights 26 bring the doors 23 back to normal positions as soon as the load is discharged. A stop 31 is attached to the side of each hopper to arrest the weight 26 to prevent the same from going too far or beyond a center. Otherwise the weights might be thrown so far that they would not bring the doors back to normal positions.

Means are provided for shifting the valve which permits grain to flow into the hoppers alternately and for regulating the tilting of the hoppers. A double valve for cutting off the flow of grain from a supply source to the hoppers is provided. This valve is provided with openings 33 and 34 and the valve is pivotally mounted on a pivot 35 or trunnion on each side of the feeding hopper 36 by means of hangers 37. The feeding hopper 36 may be mounted on the frame by brackets 38. The valve 32 is curved as shown and the valve is swung on the pivots 35 by the hoppers. Arms 39 are attached to the hoppers 16 and 17 and pins or lugs 40 are attached to the edge of the valve and projected loosely through the arms 39. As the hopper moves the valve is drawn with the hopper.

The following is a description of the means for causing the hoppers to move gradually. A weighted lever 41 is fulcrumed in a hanger 42. This lever 41 has an arm 43 which engages a lug 44 which is attached to the hopper. A forked stop 45 is attached to the frame to prevent the lever 41 from being thrown too high after the hopper has discharged its load or charge. A dog hanger 46 is attached to the frame of the machine and hangs through a guide 47 which maintains hanger 46 in the same vertical plane. The guide 47 is slotted to permit movement of the hanger 46. A dog 48 is fulcrumed in the hanger 46. The dog 48 engages a lug 49 which is attached to the hopper. A spring 50 is attached to the frame and to the bottom of the hanger 46. A hammer 51 is carried by the lever 41. In operation, the hopper descends slowly when grain commences to flow therein. The hopper 16, for example, moves downward gradually until the lug 44 releases the arm 43. While the hopper is descending, the spring 50 is pulling on the lug 49 by means of the dog 48 and hanger 46. This makes the movement of the hopper gradual and while this operation is going on the arms 39 are gradually moving the valve 32 and making the opening for the passage of grain smaller. The hopper continues to descend until the lug 44 releases the arm 43. The hammer 51 will then trip the dog 48 and the hopper is released. The hopper closes the valve 32 automatically following the release of the lug 44 and at the same time the hopper has passed on the center of its pivot shaft 20. The weighing takes place at this time and the hopper is tilted. The arm 28 strikes the trip 30 and this releases the trap door 23. At the same time the other hopper 17 is brought under the opening on the other side of valve 32 and grain commences to fill the other hopper. Each hopper is provided with duplicate mechanism and the hoppers when once started to work continue automatically to be filled and discharged alternately. Immediately after a hopper obtains the desired weight, it tilts to discharge its load and at the same time brings the other hopper in position to be filled and the filling goes on as above described. By reason of the fact that the valve is gradually closed there is no dribble between the valve and the hopper to vary the weight. The amount of grain to be obtained at each charge is regulated by adjustment of the weight 52 on the scale beam 4. The scale beams may be further adjusted by the weights 10 and 53.

As the hoppers oscillate to discharge and be filled, it is important that the scale beams 11 move only in the same vertical plane. For causing such movement a bolt 54 is projected through the brace 55 and through the clevis 15 to prevent the vibration of the clevis out of its plane. As the hoppers will fall with considerable force toward each side, a spring buffer 56 is mounted on the frame of the machine approximately at the limit of the fall of the hopper so that the hopper will come against the spring buffer and thus prevent the pounding of the hopper.

Having fully described my invention, what I claim as new and desire to secure by Letters Patent, is,—

1. A weighing machine having a frame, a pair of scale beams suspended on said frame, a pair of supporting beams suspended at one end on said scale beams and at the other end suspended on said frame, a feeding hopper mounted on said frame, a discharge hopper provided with two compartments pivotally mounted on said supporting beams, a double valve pivotally mounted on said feeding hopper and operatively connected with said discharge hopper whereby said valve is shifted as the discharge hopper is shifted, a trap door for each compartment of said discharge hopper, means for releasing said trap doors when said discharge hopper is tilted, and weights movable on said scale beams to determine when said hopper is to be tilted.

2. A weighing machine having a frame, a pair of scale beams suspended near one end on said frame, a pair of supporting beams suspended at one end on said scale beams and at the other end suspended on said frame, a rocker shaft journaled in said supporting beams, a double weighing hopper mounted on said rocker shaft, a feed hopper mounted on said frame, a double valve pivotally mounted on said feed hopper, means connecting said valve loosely with the two parts of said double hopper whereby said valve is shifted when said hopper is shifted, weights mounted on said scale beams to determine when said discharge hopper is to be shifted, trap doors for said double hopper, dogs for holding said trap doors closed, and tripping devices for automatically releasing said doors when the double hopper is tilted.

3. A weighing machine having a frame, a pair of scale beams suspended near one end on said frame, a pair of supporting beams suspended at one end on said scale beams and at the other end suspended on said frame, a rocker-shaft journaled in said supporting beams, a discharge hopper having two compartments and being pivotally mounted on said rocker-shaft, a discharge chute for each compartment, a feed hopper for said compartments mounted on said frame, a valve having two discharge ways and being pivotally mounted on said feed hopper and being loosely connected to each compartment of said discharge hopper whereby the communication from said feed hopper to one of said discharge compartments is gradually closed and completely closed at the moment the desired quantity is received into the discharge compartment and the communication from the feed hopper opened to the empty discharge compartment, and means for retarding the tilting of the discharge compartments.

4. A weighing machine having a frame, a pair of scale beams suspended on said frame, a pair of supporting beams suspended at one end on said scale beams and at the other end suspended on said frame, a rocker-shaft journaled in said supporting beams, a discharge hopper pivotally mounted on said shaft and having two compartments adapted to discharge on either side of said rocker-shaft, a feed hopper mounted on said frame, a curved valve and arms for said valve pivotally mounted on said feed hopper, said valve having a passage way from said feed valve to one of said compartments and a second passage way from said feed valve to the other compartment, said compartments having connections with said valve whereby said valve is automatically shifted as one compartment is being filled to bring a passage way of the valve in communication with an empty compartment, and means for retarding the shifting of said compartments.

In testimony whereof, I set my hand in the presence of two witnesses, this 21st day of June, 1909.

ANDREW J. BALL.

Witnesses:
  A. L. JACKSON,
  E. B. RANDLE.